T. I. Stealey.
Harvester Rake.

No. 2483 Reissued Feb. 12, 1867.

Witnesses.
Edw Schafer
Henry Sylvester

Assignee.
R. S. Campbell

T. I. Stealey.

Harvester Rake.

No. 2483

Reissued Feb. 12, 1867

Witnesses
Edw Schafer
Henry Sylvester

Assignee.
R. T. Campbell.

T. I. Stealey.
Harvester Rake.

№ 2483 Reissued Feb. 12, 1867.

Witnesses
Edw Schafer
Henry Sylvester

Assignee.
R. I. Campbell

T. I. Stealey.
Harvester Rake.

No. 2483 Reissued Feb. 12, 1867

Witnesses.
Edw. Schafer
Henry Sylvester

Assignee.
R. G. Campbell

T. I. Stealey.
Harvester Rake.

№ 2483 Reissued Feb. 12, 1867.

Witnesses.
Edw Schafer
Henry Sylvester

Assignee.
R. S. Campbell

T. I. Stealey.
Harvester Rake.
No 2483 Reissued Feb. 12, 1867.
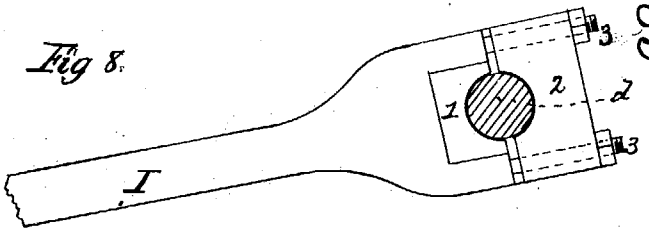
Fig 8.
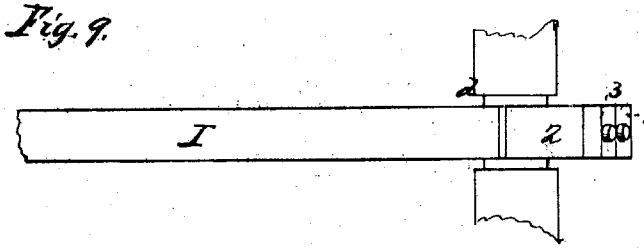
Fig. 9.
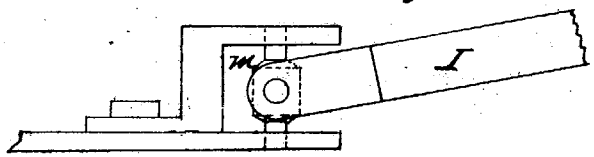
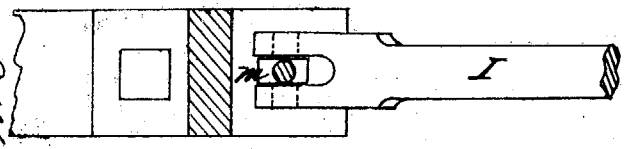
Witnesses.
Edw Schafer
Henry Sylvester
Assignee.
R. H. Campbell

UNITED STATES PATENT OFFICE.

ROBERT T. CAMPBELL, OF WASHINGTON, DISTRICT OF COLUMBIA, ASSIGNEE OF THOMAS I. STEALEY.

IMPROVEMENT IN HARVESTERS.

Specification forming part of Letters Patent No. 18,871, dated December 15, 1857; reissue No. 2,388, dated November 6, 1866; reissue No. 2,483, dated February 12, 1867.

DIVISION A.

*To all whom it may concern:*

Be it known that THOMAS I. STEALEY, formerly of Middlebourne, in the county of Tyler and State of Virginia, but now a resident of Wheeling, in the State of West Virginia, did invent certain new and useful Improvements in Harvesting-Machines; and your petitioner hereby declares that the following is a full, clear, and exact description thereof, reference being had to the accompanying drawings making a part of this specification, in which—

Figure 1:
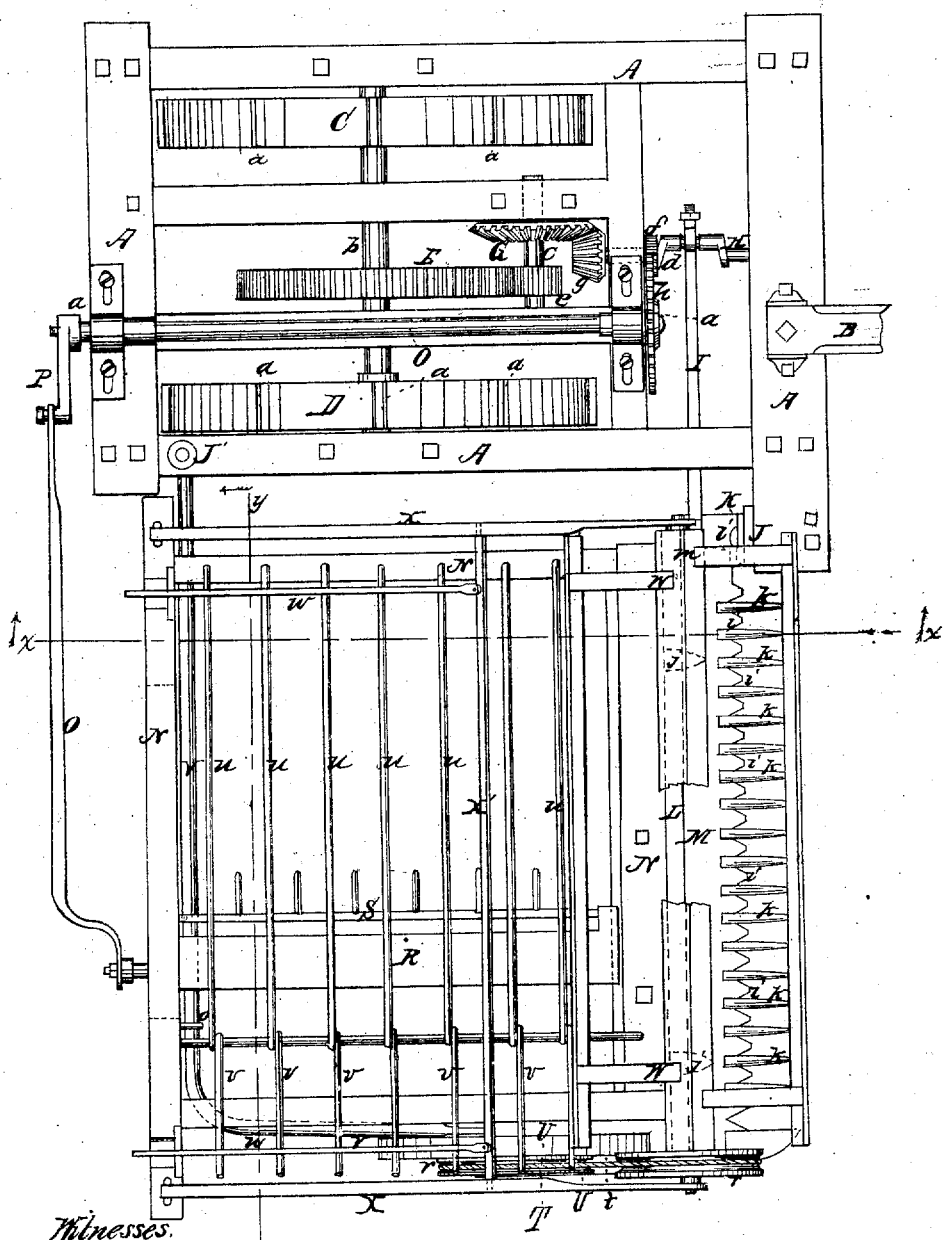
Figure 2:
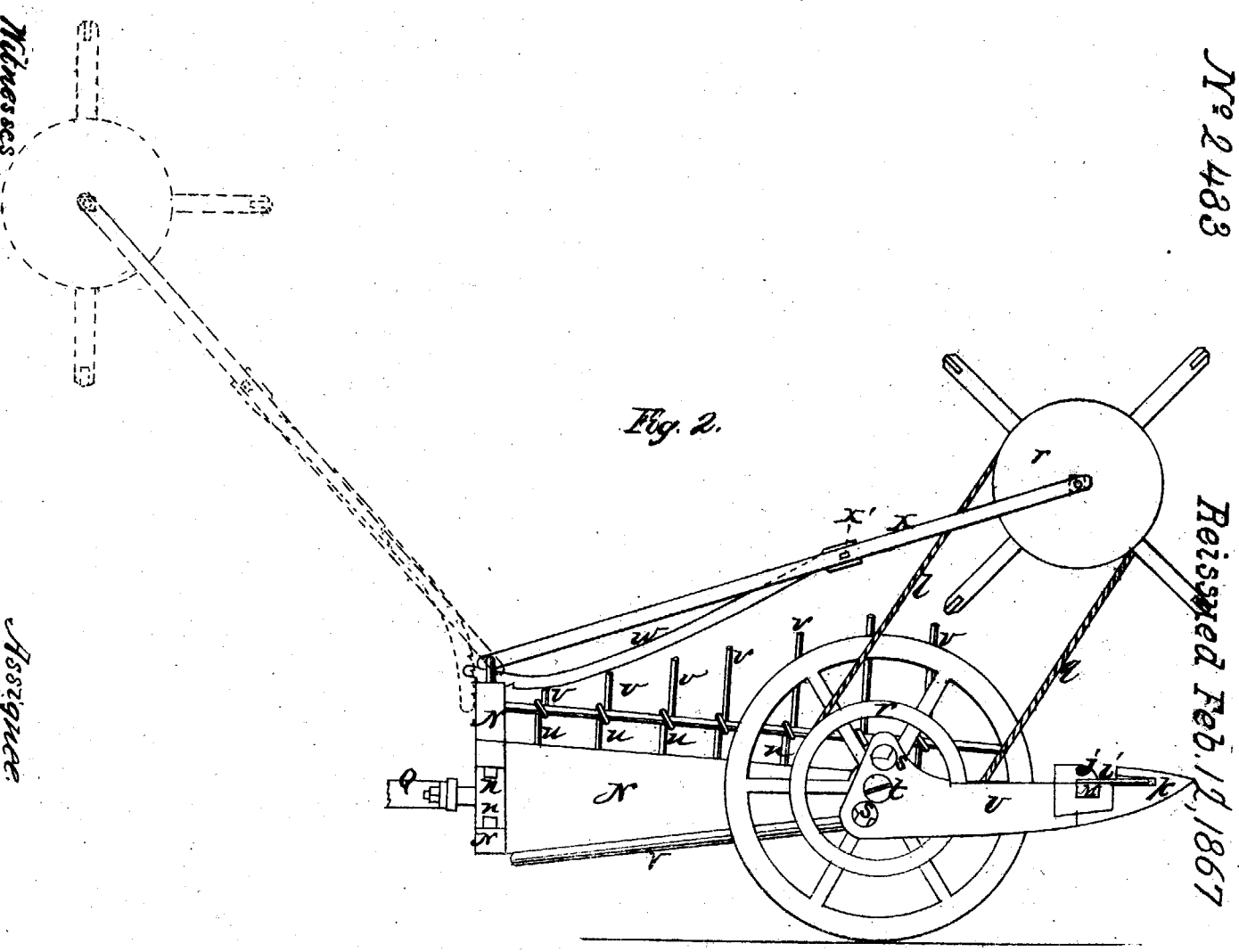
Figure 3:
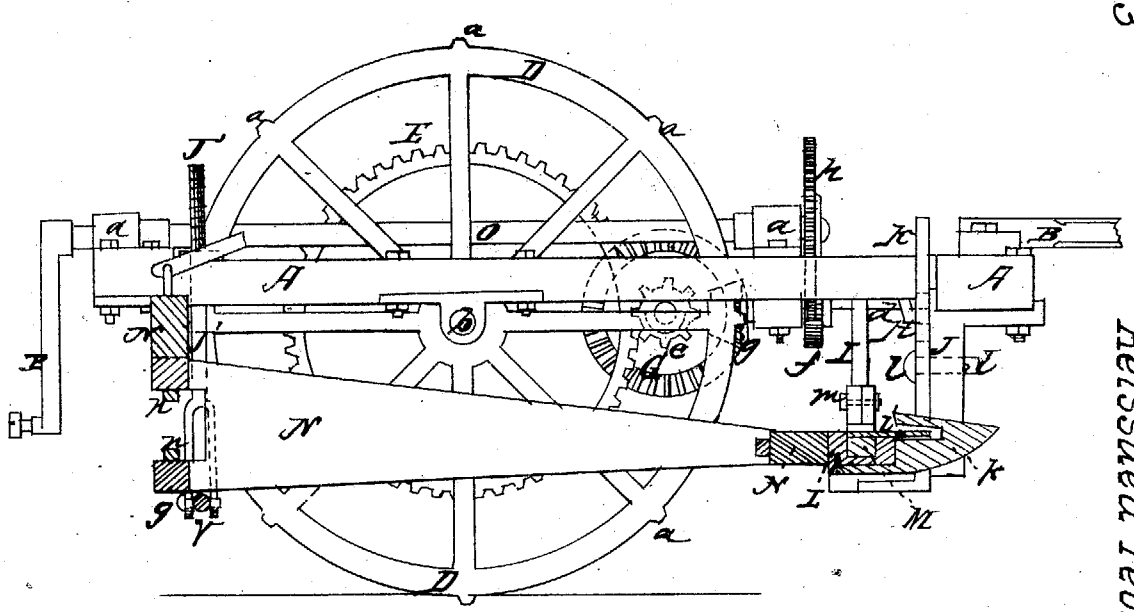
Figure 4:
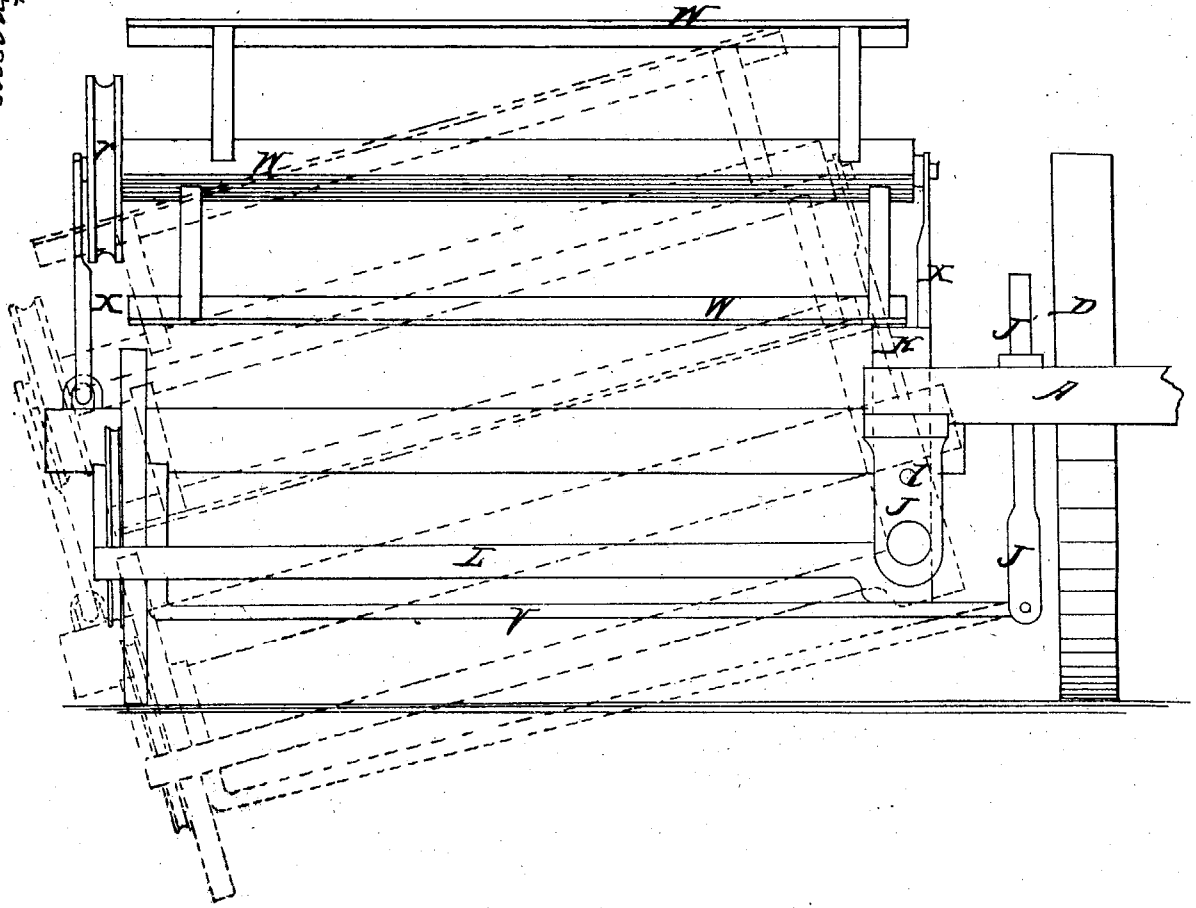
Figure 7:
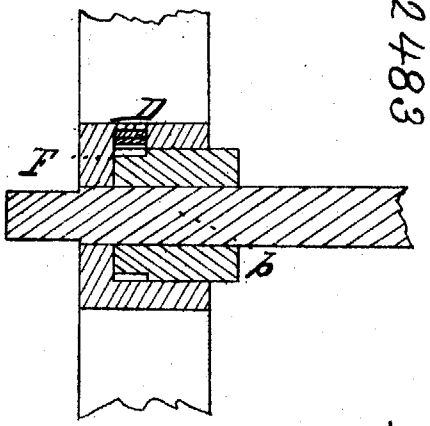
Figure 6:
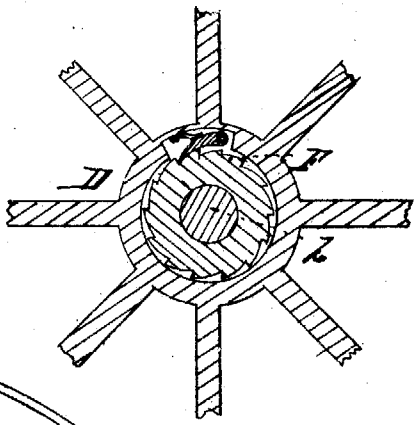
Figure 5:
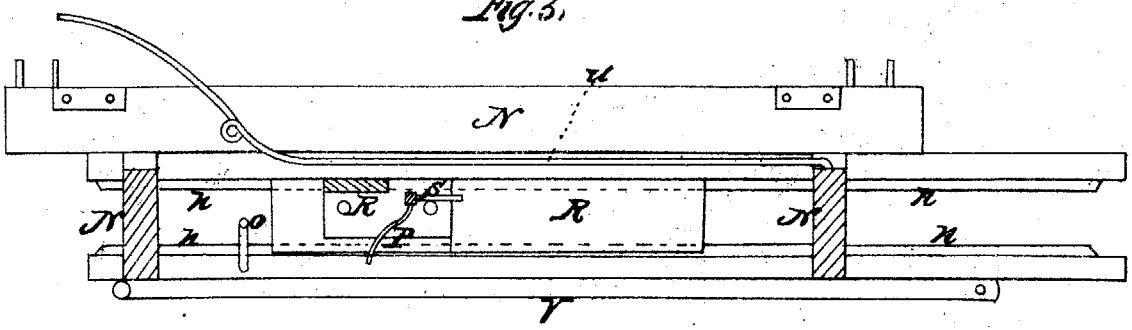
Figure 10:
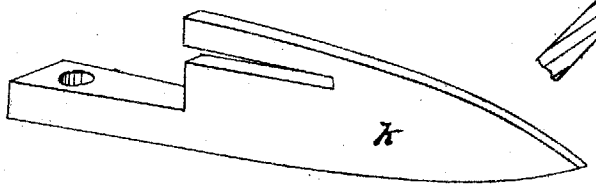

Figure 1, Sheet 1, is a plan view of the machine arranged as a reaper. Fig. 2, Sheet 2, is an elevation of the outer end of the machine. Fig. 3, Sheet 1, is a longitudinal section taken through Fig. 1 in the vertical plane indicated by red line *x x*. Fig. 4, Sheet 2, is a front elevation of the finger-beam and a portion of the draft-frame, showing the mode of connecting these parts by a joint. Fig. 5 is a section taken in the vertical plane indicated by red line *y y*, Fig. 1, looking toward the rear of the machine. Figs. 6 and 7 are views in section of a mode of connecting one of the transporting-wheels to its axle. Figs. 8 and 9 are enlarged views of the pitman-rod and its connections for moving the sickle. Fig. 10 is a perspective view of one of the teeth.

Similar letters of reference indicate corresponding parts in the several figures.

One object of this invention is to have the device which gathers in the standing grain to be cut, and also a toothed rake which will discharge the grain from the platform in gavels or bundles, supported wholly upon a platform which is hinged to and projects from one side of the draft-frame, and which receives its vertical vibrating movement, independently of the motion of the main frame, from the undulations of the ground, as will be hereinafter described.

Another object of this invention is to provide for giving a vertical adjustment to the hinge-connection, or joint of a platform which has a toothed rake and a gathering device, combined with and supported wholly upon it, so that said parts can be adjusted bodily, according to the height of the cut desired, as will be hereinafter described. Another object of this invention is to employ a universal joint to connect the pitman-rod with the cutter-bar, in connection with adjustable bearing-blocks for tightening the crank-wrist joint, in combination with a vertically-adjustable hinge-joint cutting apparatus.

Another object of this invention is to provide for suspending the rear inner end of the platform from the draft-frame by means which, in conjunction with the forward hinge-connection, will allow the platform and finger-beam to vibrate freely at their outer ends, and to be adjusted vertically at their inner ends, as will be hereinafter described.

Another object of this invention is to support a rake and a reel, or grain-gatherer, entirely upon a platform, which is supported at its inner end by a hinge-connection, and at its outer end by a wheel or its equivalent.

Another object of this invention is to combine, in a harvester, a hinged finger-beam, a grain-platform, and an auxiliary adjustable suspending and sustaining jointed or flexible connection, in such manner that the finger-bar and platform are firmly suspended at their inner ends, and are free to conform, at their outer ends, to the undulations of the ground, independently of the main frame or of the axle of the supporting-wheels.

Another object of this invention is to provide for driving the rake on a hinged platform with varying speeds.

Another object of this invention is to provide for adjusting the reel, or grain-gatherer on a hinged platform, to different heights and positions according as circumstances may require.

Previous to the application for the original patent in this case, several harvesting-machines were constructed, in which a carrier or apron, a gathering device for the standing grain, and a hinged platform, were all combined; but they are, as I believe, all liable to objections which have been successfully obviated by this invention, for which full protection is now sought.

In the application of Geiger for Letters Patent for a machine for topping and thrashing grain, rejected in the year 1849, he shows such a combination as I have above mentioned; but he never contemplated the use of a free pivoted connection of the platform with the draft-frame, which would allow the platform to descend below a horizontal line; nor did he contemplate having the platform or finger-beam receive a motion from the undulations of the ground independently of the motion of the draft-frame. His platform is supported wholly at one end by the draft-frame, and was only hinged thereto in order to have it elevated out of the way when not in use. With this machine it was very easy to have the rake supported upon the platform. In this rejected application there is no provision made for regulating the height of the platform according to the height of the grain.

In other cases where a carrier, a reel, and a hinged platform have been combined, the reel, or device for gathering in the standing grain to the cutters, was supported partly by the draft-frame and partly by a post projecting up from the outer end of the platform. The objection to this mode of supporting a reel or other gathering device is that the reel-shaft will bind and work hard in its bearings, and the reel-blades are liable to become twisted and broken by the vibrations of the platform. This objection was to some extent modified by having the inner end of the reel-shaft pivoted by a gimbal-joint to a shaft which communicated motion to the reel, and which was supported wholly upon the draft-frame, but the objection was not wholly removed, as the reel would not maintain its parallelism at all times with the platform, and was difficult to drive.

Having thus stated the general principle of this invention, I will now proceed to describe in detail one of the methods by which that principle is to be carried into effect, in order to enable any one skilled in the art to make and use the thing invented.

The driving parts of the machine are mounted in a rectangular draft-frame, A, of suitable dimensions, and to this frame the pole or draft-tongue B is secured in any suitable manner. The supporting-wheels C D may properly be made of cast-iron of sufficient weight and size, and provided with spurs *a a*, to secure a firm hold upon the ground. One of these wheels, C, being the driving-wheel, should be firmly secured to its axle *b*, while the other, D, may turn freely upon the axle. Or a ratchet-wheel, F, shown in Figs. 6 and 7, Sheet 2, may be placed within, or at the side of its hub, in order to enable this wheel also to assist in driving the working parts, and at the same time adapt itself to any difference of speed which may be required of the two wheels by turning the machine. On the axle *b*, which is in bearings beneath the draft-frame, a large spur-wheel, E, is keyed, which engages with a pinion spur-wheel, *e*, and on the transverse shaft *c* of this pinion *e* a bevel spur-wheel, G, is keyed, which engages with a suitable pinion, *g*, on the longitudinal crank-shaft H. From the crank *d*, of shaft H a pitman, I, extends to the cutting-bar M, with which it is connected by a universal joint, *m*. This construction of joint allows a free motion and adustment of the finger-beam and cutter-bar in every direction, and at the same time admits of the joint being made strong and closely-fitting, so as to avoid undue friction and wear at this point. The pinion-shaft *c*, and also the crank-shaft H, are supported in bearings which are located beneath the draft-frame, as shown in Fig. 3, so as to have less inclination of the pitman-rod I, and also to leave the front part of the draft-frame clear. The inner end of the pitman-rod I is constructed with half-boxes 1 2, which receive between them the crank-wrist *d*. The half-block 1 is fitted into the forked end of the pitman-rod, and the block 2 is firmly secured on this end of the pitman by means of studs and nuts 3 3. The boxes or blocks 1 2 are not set close together, so that as they wear away around the wrist *d* they can be easily tightened again by setting up the nuts 3 3. Thus this point of connection of the pitman can be prevented from working too loose, or so loose as to cause an irregularity in the movement of the sickle. The blocks 1 2 may be made of brass, or some metal different from that of which the crank-pin *d* is made, for the purpose of increasing the smoothness of the joint. The cutter-bar M is sunk entirely into, and slides in, a groove in the upper side of the finger-bar L, where it may be secured by fixed tongues *j j*. The cutters *i i* may be separately secured to the cutter-bar, or compose a single cutter-blade, to be attached thereto. The guard-fingers *k k* are secured to the under side of the finger-bar L, and the notches or grooves through which the cutters slide should be sufficiently wide to allow space enough above these cutters to prevent the clogging of grass or grain therein. The lower cutting-edges of the cutters should, of course, move in close contact with the lower sides of the finger-notches. The finger-bar L is provided with an arm, K, projecting perpendicularly upward from its inner end, or that end which is nearest the draft-frame. This arm is provided with a set of holes at regular distances apart, as shown by dotted lines in Fig. 3, through any one of which a bolt, *l*, passes, and also through a hole in a bearing or hanger, J, which is attached rigidly to the frame A. The holes for pin or bolt *l* are of larger diameter than the pin, so as to allow the rear of platform to rise and fall. On this bolt the finger-bar oscillates or vibrates, so that it can be raised as far as necessary from the ground at its outer end, or adapt itself to any unevenness of the surface of the ground. The outer end of the finger-bar L is supported upon the ground by a wheel, T, which runs in bearings U U projecting backward from the outer end of said finger-bar. These bearings have a set of vertically-arranged holes, *s s s*, Fig. 2, corresponding in their distance apart and height with the holes in the arm K, which is fixed to the inner end of the finger-beam. The axle *t* of the wheel T is inserted into any of these holes, *s*, corresponding with the hole in arm K, which receives the pivot-bolt *l*, and thus the finger-bar is adjusted to any height from the ground desired, so as to leave a shorter or longer stubble, at pleasure; also leaving the hinge movement of the finger-bar free and unimpeded in all adjustable positions given to said finger-bar. This vertical adjustment and the hinge movement of the finger-bar do not, in the least, interfere with the motion communicated to the cutter-bar, since the employment of the crank and pitman for actuating the cutters admits of such movement and adjustment without derangement, and the universal joint which connects the pitman to the cutter-bar prevents the possibility of binding the motion of said bar.

The rake platform or frame N, to be used in reaping, is suitably secured at its front edge to the rear edge of the finger-bar L. At the rear edge of this frame is a strong brace or bar, V, one end of which projects from the inner corner of said frame and is hinged by a pivot-bolt, *g*, Fig. 3, to a loose or free hanger, J′, extending downward from the frame A. The hanger J′ is applied to its frame A, so as to be self-adjustable vertically—that is to say, this hanger will rise and descend freely with the platform and prevent the inner end of the platform from descending below the desired level. The hanger or flexible connection J′ is located in rear of the jointed connection of the finger-bar and out of the way of a rake, if the latter is used; and by means of the nut on top of frame A the rear part of the platform can be raised or lowered, as circumstances may require. Thus it will be seen that the rake frame or platform is held up by the main frame A in rear of the finger-bar joint and independently thereof. Transversely over the rake-frame a set of rods, *u u*, or their equivalents, are secured, substantially as represented, to receive the falling grain, and their outer ends *v v* turn upward at an inclination which will keep the grain above the wheel T and throw it inward at the outward edge sufficiently to be reached by the rake, and also to give room for the teeth of the rake to turn up beneath. The grain is delivered by the rake over the inner edge of the rake-frame and deposited upon the ground out of the path of the team in the next passage around the field. The rake S is located just beneath the rods *u*, so that its teeth, when upright, will project upward beyond them and the grain, which is lying across them. The rake bar or head is pivoted, at its end, in a carrier, R, the rear end of which slides between ways *n n* located transversely along the rear edge of the rake-frame. This cross end, which slides in the ways *n n*, is extended as far as the construction of the reaper will admit, in order to give a long bearing in the ways, and thereby prevent the rocking of the carrier from its proper position so as to impede its free motion. The rake-head being pivoted in its bearings, so as to turn freely forward one-fourth of a circle or thereabout, as soon as it begins to retreat from the terminus of its inward movement, after having cast off a bunch of grain, allows its teeth to fall by their own weight, or the slightest resistance offered by the grain, which lies on the supporting-rods *u u*, to a horizontal position, as shown in Fig. 5. In order to raise the teeth again to a vertical position for action at the outer termination of the rake's movement, a cam-projection, *p*, Fig. 5, is secured to the rake-head at one end, and a stop, *o*, is attached to the rake-frame in a proper position to act upon the cam *p* just as the rake reaches the outer termination of its stroke. When once the rake-teeth are brought to a vertical position, the rake-head, not being allowed to turn back any farther, the resistance of the grain, against which the teeth are drawn, keeps them upright during the inward stroke of the rake. The reciprocating motion is communicated to the rake through a pitman, Q, extending from a crank, P, to the rake-carrier R. This crank is secured to a shaft, O, which extends forward over the frame A, and receives a rotary motion from a pinion, *f*, on the crank-shaft H, through a gear-wheel, *h*, on the front end of said shaft O. In order to vary the speed of the rake the gear-wheel *h* can be readily removed, and others of a different size used; and in order to make the several sizes of these gear-wheels engage properly into the pinion *f* the bearings *a a* of the shaft O are made laterally adjustable on frame A, as shown in the drawings, or in any other convenient manner.

The employment of the crank and pitman P Q for communicating the motion to the rake allows this adjustment to be made without in the slightest degree disarranging the action of the rake, as well as allowing the vertical adjustment and hinge movement of the rake-frame without disarrangement of any part.

To avoid variation of the limits of the rake's movement by the adjustment of the bearing *a a*, the pitman Q may be lengthened or shortened by using a set of holes therein to receive the wrist of the crank P.

The reel W is supported by arms X X, which are hinged to the back part of the rake frame or platform N, as represented in the drawings, whereby the reel may be swung over to the standing grain without interfering with the deposit of the falling grain, or with the operation of the rake beneath. It is often requisite, also, to have free access to the top of the rake-frame, and this method of hinging the reel thereto enables it to be swung back out of the way in such cases. At some distance from the lower ends of the swinging arms X X, braces *w w* are hinged to a bar, X′, connecting the arms X, for the double purpose of strengthening the reel-frame, and furnishing a support for these braces, whch extend downward a sufficient length to reach the upper edge of the platform or frame N in whatever position the reel may be placed. The lower ends of said braces are curved and notched in the outer edges of the curved portion, substantially as shown in Fig. 2. These notches receive or bear against the corners of the upper edge of the rake-frame, which should be a few inches lower than the joints of the arms X. The effect of this arrangement of the notched braces is to retain the reel at various heights, according to the particular notches which rest against the rake-frame, whether the reel is swung forward to the standing grain, as shown in black lines in Fig. 2, or swung back off from the rake-frame, as indicated in red lines in the same figure, and at the same time they brace or firmly hold the reel in the different positions by reason of the eccentricity of their points of support on the rake-frame from the center of the reel's swinging movement. Motion is imparted to the reel by means of pulleys *r r* attached, respectively, to the reel-shaft and to the wheel T, or its axle *t*, and of a band, *q*, connecting said pulleys. The band *q* is unclasped from the pulleys when the reel is to be swung back, and it may be lengthened or shortened in any convenient manner for adjusting the reel to different heights from the platform to adapt it to grain of different heights.

It will be seen from this description of one mode of carrying out the invention that the reel and the rake are both supported upon the platform, and that they have no support upon the draft-frame; said platform being hinged at its inner end to the draft-frame, and supported upon the ground at its outer end, so as to conform to the undulations thereof when the machine is in operation. It will also be seen that the platform N is so hinged to the draft-frame, that this platform has a free vertical vibrating movement.

With such a platform, and a reel having its inner and outer supports upon it, and a rake also supported wholly upon it, a perfectly harmonious movement of these parts is obtained without having any of the parts liable to bind and work hard. By this arrangement the objection attending reels, which are partly supported upon the draft-frame and partly upon the platform, is obviated.

I am aware that a reel which is wholly mounted upon a hinged platform has been combined with an endless apron upon such platform, which apron delivered the cut grain from the inner side of the platform. Such an arrangement is found in the patent of T. N. Lupton, dated May 8, 1855. But that apron would not deliver the grain in bundles like an intermittently-moving rake, which is so constructed and operated as to allow the cut grain to lie upon the platform until a sufficient amount has been thus accumulated, and then to rake it off. Neither is there a provision made in Lupton's patent for raising and lowering the platform or cutting apparatus to suit different heights of grain to be cut, in conjunction with his reel and endless carrier.

Having thus described one mode of carrying out this invention, I wish to be understood that I do not confine myself to the precise contrivances herein described.

I am aware that I have claimed some of the features of this invention broadly in another application made simultaneously with this, and therefore this patent is in some respects subordinate to the matter claimed in said other application.

What I claim as new, and desire to secure by Letters Patent, is—

1. Combining with a hinged platform, which is free to conform to the undulations of the ground independently of the motions of the draft-frame, or of the axle of the transporting-wheels, a toothed rake, which will deliver the cut grain upon the ground in gavels, and a reel or gathering device, which will press the standing grain toward the cutters, said rake and reel or gatherer being wholly supported upon said platform, substantially as described.

2. Combining with a hinged platform a toothed rake and a reel or gatherer, which are wholly supported upon and move in harmony with said platform, an adjustable hinged connection, which will allow of the vertical adjustment of the cutting apparatus to adapt the machine to different heights of cut required, substantially as described.

3. Sustaining a toothed rake and a reel or gatherer wholly upon a platform, which is supported at its inner end by a vertically-adjustable joint, and at its outer end by a wheel or its equivalent, substantially as described.

4. Suspending the rear inner end of a hinged platform, which has a toothed rake mounted wholly upon it in such manner that this part of the platform can be adjusted vertically without changing the position of the forward adjustable hinge connection, substantially as described.

5. The combination of a hinged finger-beam, a platform, and an auxiliary adjustable suspending and sustaining jointed or flexible connection in such manner that the finger-beam and platform are suspended at their inner ends, and are so supported upon a wheel or its equivalent at their outer ends as to conform, at their outer ends, to the undulations of the ground independently of the main frame or of the axle of the supporting-wheels, substantially as described.

6. In combination with a vertically-adjustable hinge-joint and hinged finger-beam and cutter-bar, and with the crank *d* for communicating motion to the cutters, and the universal joint *m* to connect the pitman I with the cutter-bar, substantially as described, the adjustable blocks 1 and 2, for tightening the joint around the crank-wrist *d*, substantially as set forth.

7. The combination of crank-shaft O with adjustable bearings *a a*, the pitman Q, and the oscillating rake S, substantially as described.

8. Hanging the reel to the rake frame or platform, and adjusting said reel to different heights, by means of braces *w w* or their equivalents, substantially as described.

Witnesses: R. T. CAMPBELL.

EDW. SCHAFER,

EDM. F. BROWN.